Aug. 28, 1956         J. E. WAMPLER         2,760,789
DETACHABLE VEHICLE TOWING DEVICE
Filed March 15, 1954
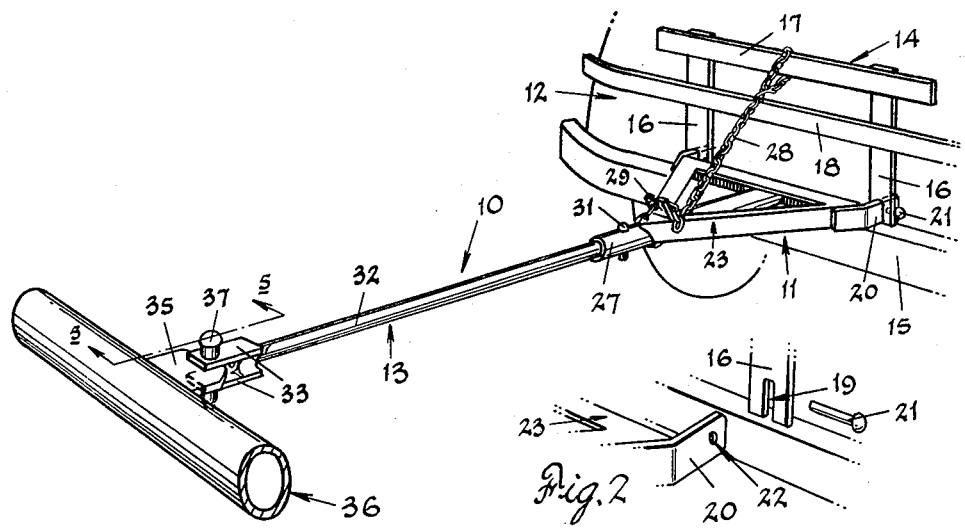
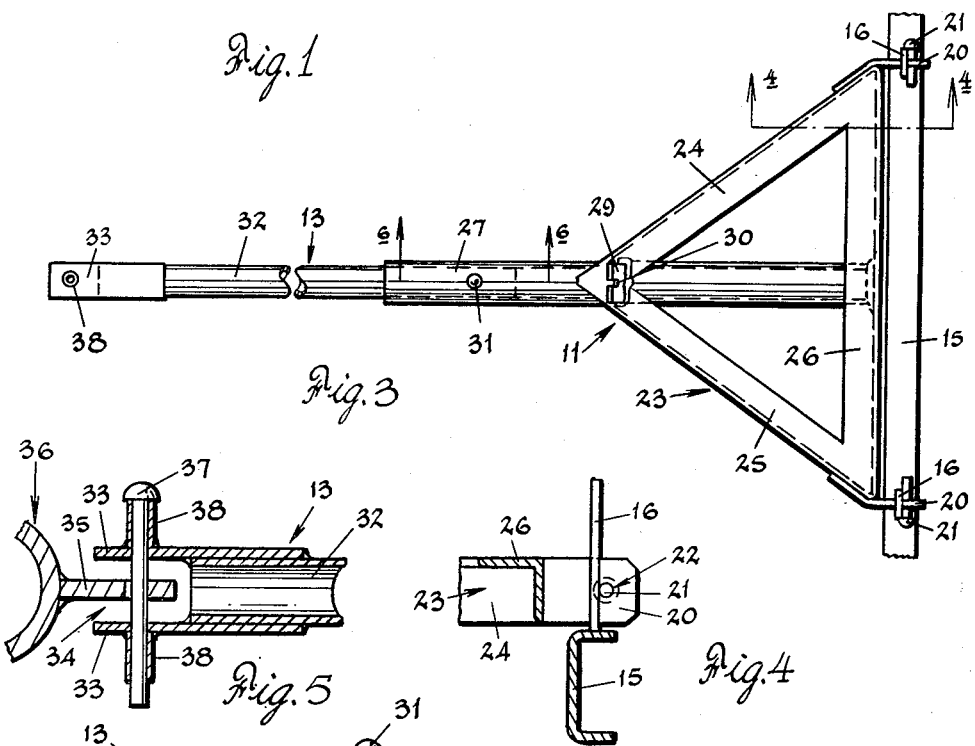
Inventor
John E. Wampler
Nobbe & Swope
Attorneys

United States Patent Office 2,760,789
Patented Aug. 28, 1956

2,760,789

DETACHABLE VEHICLE TOWING DEVICE

John E. Wampler, Garden City, Kans.

Application March 15, 1954, Serial No. 416,222

2 Claims. (Cl. 280—494)

The present invention relates broadly to towing devices, and is more particularly concerned with a new and improved draft-hitch for interconnecting a series of vehicles together.

It is therefore an important aim of this invention to provide a draft-hitch which is of relatively light weight and relatively simple construction, thereby permitting a single operator to tow at least two vehicles between working areas with a minimum of time and effort spent in the attaching operation.

Another object of the invention is to provide a towing device of sturdy construction by means of which a vehicle of substantial weight can be caused to follow the same path as the lead vehicle without undue swerving from side to side, and which also permits a vehicle to be towed onto and off uneven terrain and to negotiate turns with relative ease and without damage to the vehicle being led or the towing device itself.

Another object of the present invention lies in the provision of a novel draft-hitch which is adapted for use by a single operator and on existing equipment without substantial changes thereto, said hitch being provided with means for holding it in a generally horizontal ready position to facilitate the connecting procedure by said single operator.

A further object of the invention is to provide a draft-hitch having each of the foregoing advantages, and which comprises a framework designed for removable attachment to the front of the vehicle to be towed, and an elongated member provided at one end with means for making connection with said framework and at its opposite end with means for effecting an attachment to the lead vehicle.

Other objects and advantages of the invention will become more apparent during the course of the following description when taken in connection with the accompanying drawings.

In the drawings wherein like numerals are employed to designate like parts throughout the same:

Fig. 1 is a perspective view of the towing device of the present invention;

Fig. 2 is a fragmentary perspective view illustrating a manner of attaching the draft-hitch to a vehicular bumper frame;

Fig. 3 is a plan view of the improved hitch herein disclosed;

Fig. 4 is a vertical longitudinal section taken substantially along the line 4—4 of Fig. 3;

Fig. 5 is a vertical longitudinal section taken substantially along the line 5—5 of Fig. 1; and Fig. 6 is a vertical longitudinal section taken substantially along the line 6—6 of Fig. 3.

With reference now to the drawings, and more particularly to Fig. 1 thereof, there is shown a draft-hitch 10 which embodies the several features of the present invention. As may be seen therein, the hitch or towing device 10 is preferably formed of two parts, a substantially A-shaped framework 11 which is adapted for attachment to a vehicle 12, and a generally cylindrical draft connection 13 constructed to make coupling engagement with another vehicle, as for example, a farm implement.

The present draft-hitch 10 is particularly suitable for interconnecting a series of wheeled vehicles together, and one manner in which it has shown considerable utility is in the towing of a ¾ ton truck behind a farm implement such as a cultivator or seeder, which in turn is pulled by a tractor or the like. Thus, the draft-hitch 10 is employed to connect the truck to the farm implement, and conventional linkage means may be used between the implement and tractor.

For this purpose, the truck or other vehicle 12 to be towed may be provided with a substantially vertical bumper frame 14 welded or otherwise secured to the front bumper 15 of the vehicle 12, or as an alternative, the A-shaped framework may be suitably pinned to the bumper guards commonly found on motor vehicles, or other suitable means of a similar character may be used to attach the framework 11 to the front of the vehicle 12 to be towed. Generally, however, a bumper frame 14 of substantially the construction shown is preferred, and as is illustrated in Fig. 1, such a frame comprises a plurality of spaced uprights 16, secured by welding or other means to the bumper 15, and at least two spaced horizontal members 17 and 18 affixed to the uprights 16.

Each of uprights are provided with an opening 19 (Fig. 2) adjacent the bumper 15 for the purpose of receiving the legs 20 of the generally A-shaped framework 11, whereby after insertion of said legs through the openings, pins or the like 21 may be passed through holes 22 in each of said legs to assure a firm connection between the framework 11 and the bumper frame 14.

Secured by suitable means to the legs 20 of the framework 11, and comprising an integral part of said framework, is a generally triangular portion 23. This portion, which may be formed of three pieces of angle stock 24, 25 and 26 welded or otherwise secured together at their opposite ends, makes connection with a tubular member 27, said member being attached to the triangular portion at the juncture of the legs or angle pieces 24 and 25, and also to the base or angle piece 26 of said portion. If it is desired to reinforce the legs 20, the vertical walls of the angles 24 and 25 may be extended in parallel with the legs 20 and secured in surface contact thereto. The combined thicknesses of such walls and legs 20 will thus provide an exceedingly rigid connection for the framework 11 to the uprights 16 as when they are inserted through the openings 19 therein and secured by pairs 21.

If desired, to assist in maintaining the A-shaped framework 11 in a substantially horizontal position, and to thereby facilitate the attachment of the draft connection 13 to said framework, a chain or the like 28 may be employed. As shown in Fig. 1, one end of the chain may be hooked around the upper horizontal member 17 of the bumper frame 14, and the other end held in a cut-out portion 29 provided in an angularly arranged plate 30 carried by the upper surface of the triangular portion 23 of the framework 11.

The draft connection 13, which may be joined to the tubular member 27 of the framework 11 by a bolt or the like 31 passing through holes in each, includes a tube-like member 32 of a relatively smaller outer diameter than the member 27 so that it may be passed therein. Preferably the tube-like member 32 may have an extra heavy wall in cross-section or, be composed of the outer member 32 and an interfitting sleeve or pipe member that will operate to reinforce the draft connection 13. And carried at the opposite end of said tube-like member 32 is a pair of parallelly disposed plates 33, which may be secured by welding to said member 32 and provide there-between an open-sided mouth 34 in which may be received the tongue 35 on the rear portion 36 of a farm implement or the like. As is best shown in Fig. 5, the draft connection 13 is swingably joined to the tongue 35 of the leading farm implement by means of a bolt or other suitable device 37 passing through the plates 33 and tongue 35. To facilitate the insertion of the bolt 37 through said plates and tongue, the outwardly directed surface of each of the plates 33 is provided with a rigidly affixed aligning sleeve or tube 38.

The draft-hitch 10 above described may be readily employed by a single operator to connect a vehicle to a farm implement by simply inserting the legs 20 of the A-shaped framework 11 into the openings 19 in the uprights 16 of the bumper frame 14. After inserting the pins 21 through the holes 22 in said legs, the tube-like member 32 of the draft connection 13 is slid into the tubular member 27 and secured firmly therein by means of the bolt 31. Thereafter, the draft-hitch 10 as thus assembled is elevated to the proper height, that is, to match as nearly as possible the level of the farm implement or other vehicle to which it is to be attached, and maintained at the selected height by use of the chain 28. The vehicle 12, subsequently to be towed, can then be driven forwardly until the plates 33, at the end of the draft connection 13, are suitably aligned with the tongue 35 on the portion 36 of the farm implement. Since the projecting end of the draft connection can be readily observed from the driver's position, the vehicle 12, then being operated, can be easily directed toward the tongue on the farm implement so that their engagement by the bolt 37 can be rapidly effected individually and with a minimum amount of labor. Alternatively, the tractor, or other vehicle to which the farm implement is already attached, can be backed to a position closely adjacent the mouth 34 at one end of the draft connection 13, and the bolt 37 slipped through the plates 33 and tongue 35.

It will be appreciated that in certain instances the particular pin and slot arrangement 19—22 provided on the legs 20 of the A-frame 11 may be dispensed with, and the legs held against the bumper frame 14 or bumper 15 itself merely by the action of the chain 28. Further, in some cases the A-frame 11 may be made an integral part of the front of the vehicle, and the draft connection 13 joined to said frame by being inserted therein and the pin 31 placed into the tube-like members 27 and 32.

It may be thus seen that the present hitch is capable of use by only a single person, and by means of the particular arrangement and construction of parts, permits the towing of vehicles over uneven terrain and the accomplishment of relatively sharp turns to either the right or left without damage to the hitch or the vehicles connected thereto.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:
1. In a towing device, a horizontally arranged substantially A-shaped framework, legs on the A-shaped framework for securing the same to a vehicle to be towed, a substantially vertical frame rigidly mounted on the front of the said vehicle, the frame comprising a plurality of uprights and at least one horizontal member attached to the uprights, each of the uprights being provided with slots through which the legs of the A-shaped framework are adapted to pass, the said legs having openings formed therein, means received in said openings for connecting the said framework to the vertical frame when the legs thereof have been passed through the slots in the uprights of the frame, an elongated connecting member attached at one end to a portion of the A-shaped framework and comprising a pair of interfitting sleeves, means passing through the sleeves for securing the same together at their interfitting ends, a pair of spaced plates secured in vertically disposed relation at the opposite end of the innermost sleeve, each of the plates having an opening therein which are aligned with one another, means for attaching the plates to the towing vehicle to connect the vehicle to be towed thereto and means adapted to securely support the attaching means in the said plates.

2. In a towing device for connecting a vehicle to be towed to a draft vehicle, an elongated connection including an outer tubular member and an inner tubular member interfitting therein and at one end thereof, means for removably securing the adjoining ends of the inner and outer tubular members to form an integral unit, a triangular frame composed of integrally joined leg portions and rigidly secured to the opposite end of said outer tubular member at the apex formed by two leg portions thereof and midway of an opposed base leg portion thereof, leg members having pin-receiving openings therein integrally formed with the triangular frame and projecting outwardly therefrom, means on the vehicle to be towed for securing the leg members by an insertable pin connection, yoke-forming plates rigidly secured to the opposite end of said inner tubular member and having aligned holes therein for receiving a pin therethrough, means on the rear part of the draft vehicle for receiving said yoke-forming plates in overlapping relation thereto, a connecting pin, and a pair of vertically disposed sleeves secured to the outer surfaces of the yoke-forming plates and aligned with the holes therein, said sleeves being adapted to engage and firmly support the connecting pin between the ends thereof after the same has passed through the yoke-forming plates and said means on the rear part of the draft vehicle.

References Cited in the file of this patent
UNITED STATES PATENTS

| 1,693,673 | Sether | Dec. 4, 1928 |
| 2,447,250 | Holloway | Aug. 17, 1948 |
| 2,582,595 | Leveke | Jan. 15, 1952 |
| 2,585,768 | Ham | Feb. 12, 1952 |
| 2,639,933 | Meyer et al. | May 26, 1953 |
| 2,697,615 | Luebben | Dec. 31, 1954 |